(12) United States Patent
Harris et al.

(10) Patent No.: US 6,998,039 B2
(45) Date of Patent: Feb. 14, 2006

(54) CATCH BASIN FILTER

(76) Inventors: John F. Harris, 1464 Ridgeview Pl. NW., Albany, OR (US) 97321; Ardle E. Page, 1455 Center St., Albany, OR (US) 97321

( * ) Notice: Subject to any disclaimer, the term of this patent is extended or adjusted under 35 U.S.C. 154(b) by 0 days.

(21) Appl. No.: 09/769,212

(22) Filed: Jan. 25, 2001

(65) Prior Publication Data

US 2002/0096461 A1 Jul. 25, 2002

(51) Int. Cl.
*E03F 5/06* (2006.01)

(52) U.S. Cl. .............................. 210/164; 210/474; 404/4
(58) Field of Classification Search ................ 210/163, 210/164, 335, 474, 489; 404/4, 5
See application file for complete search history.

(56) References Cited

U.S. PATENT DOCUMENTS

| 4,419,232 | A | * | 12/1983 | Arntyr et al. ................ 210/164 |
| 5,284,580 | A | * | 2/1994 | Shyh ........................... 210/163 |
| 5,372,714 | A | | 12/1994 | Logue, Jr. |
| 5,575,925 | A | | 11/1996 | Logue, Jr. |
| 5,725,782 | A | * | 3/1998 | Chinn et al. .................... 404/4 |
| 5,849,198 | A | | 12/1998 | Sharpless |
| 6,086,758 | A | * | 7/2000 | Schilling et al. ............. 210/164 |
| 6,149,803 | A | | 11/2000 | DiLoreto, Jr. et al. |
| 6,214,216 | B1 | * | 4/2001 | Isaacson ...................... 210/163 |
| 6,261,444 | B1 | * | 7/2001 | Forse .......................... 210/163 |

* cited by examiner

Primary Examiner—Christopher Upton

(57) ABSTRACT

A removable filter for in ground catch basins. The present invention includes a catch basin, a top grate, a filter and an attachment of the filter to the top grate. The filter is held in place both during filtration and filter removal by the filter's attachment to the grate.

1 Claim, 2 Drawing Sheets

CATCH BASIN FILTER

BACKGROUND OF THE INVENTION

1. Field of the Invention

This invention relates to a filter for use in a storm sewer catch basin equipped with a top grate. The ground water flows through the grate into the catch basin and into the sewer line. Before the ground water flows into the sewer line it needs to be filtered free of pollutants.

2. Description of the Prior Art

In the past this has been accomplished by placing a filter bag below the grate and inside the catch basin. In U.S. Pat. Nos. 5,575,925 and 5,372,714 the filter bag is held in place by the weight of the grate against the lip of the basin opening. When the bag fills with the weight of filtered solids the bag tends to be pulled past the original position of depth. When the bag is emptied the filter bag is further pulled down into the grate risking the spilling of solids into the basin and the contamination of the sewer line. The slipping of the filter sack into the basin is prevented by the insertion of metal rods into flaps which extends away from the grate. This is an unnecessary expense in the manufacturing of the filter bag flaps, and materials, and labor.

Other filter bags which are below the grate and inside the catch basin require expensive support devices. In U.S. Pat. Nos. 6,149,803 and 5,849,198, the catch basin filter requires complex framing and supports which are unnecessary and expensive to manufacture, ship, and install. U.S. Pat. No. 5,849,198 describes a filter attached to the grate by a mechanical means such as chains or rods attached to a frame supporting a filter cartridge. These devices are unnecessary and expensive to manufacture and ship, and labor intensive to install. For the above reasons there is a need for a catch basin filter that is easy to install, environmentally safe to empty, and inexpensive to manufacture.

Our invention is a removable filter for a storm sewer catch basin equipped with a removable top inlet grate. The filter is typically composed of a porous geo textile fabric. The typical embodiment of our filter consists of a filter bag attached to the grate and suspended inside of the catch basin. The invention is an attachment means of holding a filter in place on the grate both during filtration and during filter removal. This prevents unnecessary contamination of the catch basin during service. The attachment means holds the basin filter in position by a variable opening in the top of the filter bag that comprises an opening size smaller than the grate and thereby couples the filter bag and the inlet grate together. When the filter is removed, the filter bag and grate are both removed as one unit from the catch basin. This prevents the filter from slipping free and dumping solids into the catch basin during both filtration and filter removal.

SUMMARY OF THE INVENTION

Other objects and features of the invention will become apparent as our description proceeds, especially when considered with the accompanying drawings illustrating the invention. We include one sheet and one embodiment.

DESCRIPTION OF THE PREFERRED EMBODIMENT

Figure 1:
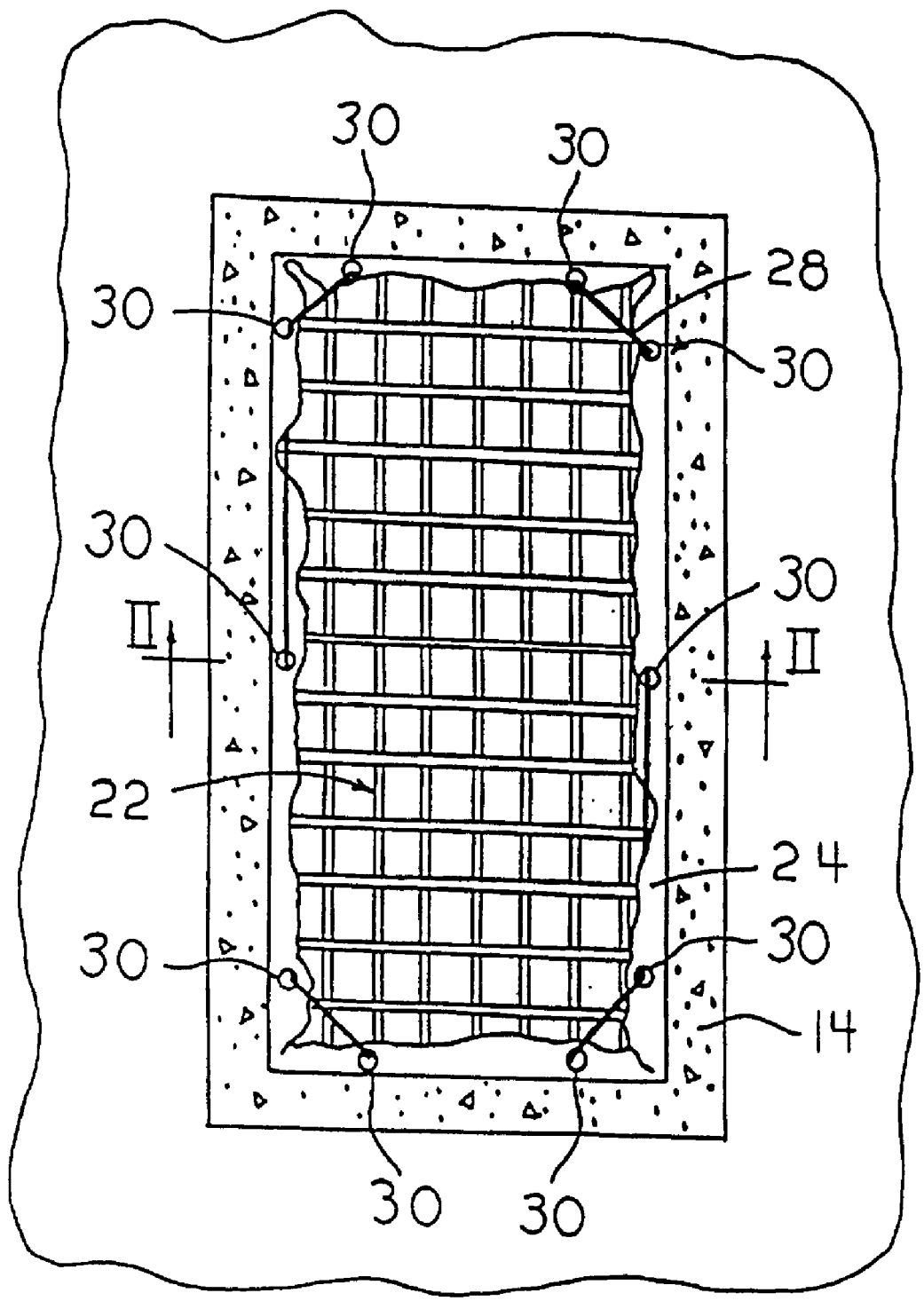
FIG. 1 is a top view of our filter bag in a catch basin below a top grate with the top edge of the bag enwrapping the inlet grate.
Figure 2:
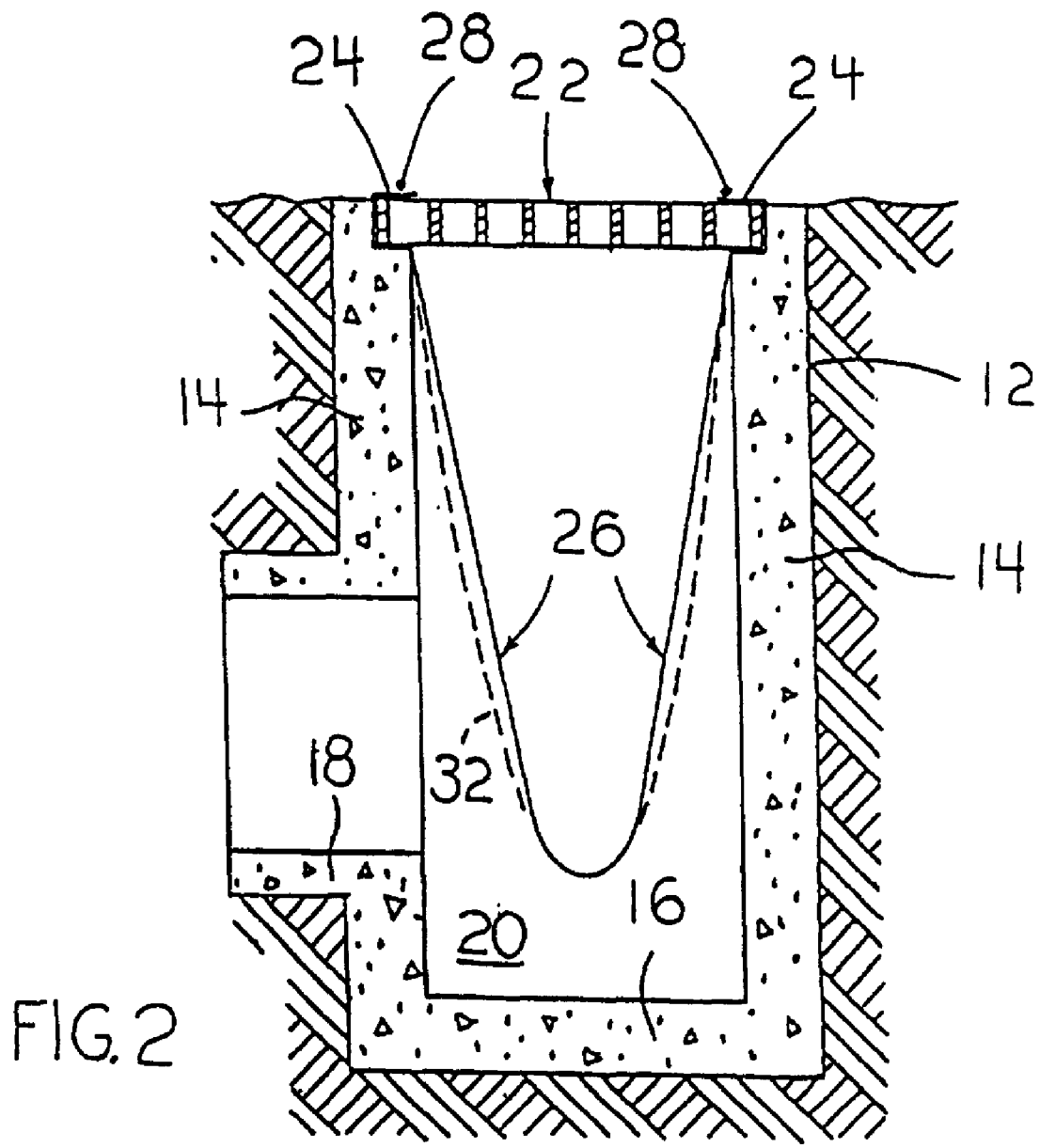
FIG.2 is a sectional view taken along line II.—II. of FIG. 1.

The concrete catch basin 12 has an inlet grate 22 located at grade level. In ground side walls 14, and floor 16. Floor 16 and side walls 14, define chamber 20. Concrete storm sewer pipe 18 extends away from one of the side walls 14 above floor 16. Rectangular inlet grate 22 closes the catch basin inlet 34. Ground water flows through the grate 22 and into the catch basin chamber 20.

The catch basin filter includes a filter bag 26 inside the catch basin chamber 20, and also a top opening of the filter bag 24 which enwraps the grate 22. Said filter bag includes four tapered side walls which are joined together to form a filter top opening to receive waste water. Filter bag 26 is preferably made from woven polypropylene fabric. The woven fabric permits water to flow freely through the filter bag 26 while retaining pollutants, including suspended solids, inside of the bag. The side walls form a bottom to retain the pollutants. When filled, the filter bag expands to full shape 32. The filter bag 26 is held in place by enwrapping the grate 22 with a top edge of the filter bag 24. The filter bag top edge 24 includes grommets 30 and a draw cord 28.

When the filter is removed, the grate 22 is used as a ridged support to lift the filter bag 26 as one unit up, out and away from catch basin 12. The filter bag 26, when full, would normally require a mechanical means for removal from the catch basin. The additional weight of a typical grate 22 would be a minimal portion of the total removed units' weight.

When the filter bag is emptied, the grate 22 is removed from the filter bag top edge 24. The filter bag 26 can then be dumped or disposed of. When filter 26 is reused, grate 22 is reinserted into filter bag 26. The filter bag top edge 24 is pulled around grate 22 using draw cord 28. The cord is pulled through grommets 30. Grate 22 and filter bag 26 are together lowered back into catch basin.

While we have illustrated and described a preferred embodiment of our invention, we wish to not be thereby limited to this preferred embodiment but wish to include such changes and variations as fall with the scope of the following claim.

What is claimed is:

1. A combination comprising:

a) a catch basin including,
  1) an inlet through which storm water and pollutants flow into a catch basin and,
  2) a catch basin inlet grate that rests in the basin opening and,
  3) a catch basin filter in the form of a bag and,
b) an improvement wherein the top of the filter bag has a variable sized opening comprising a size smaller than the grate for encircling and coupling said filter bag to said grate.

* * * * *